US008721006B2

(12) United States Patent
Uranaka

(10) Patent No.: US 8,721,006 B2
(45) Date of Patent: May 13, 2014

(54) DUMP BODY

(75) Inventor: Kyouji Uranaka, Ibaraki (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/813,537

(22) PCT Filed: Jul. 3, 2012

(86) PCT No.: PCT/JP2012/066967
§ 371 (c)(1),
(2), (4) Date: Jan. 31, 2013

(87) PCT Pub. No.: WO2013/057984
PCT Pub. Date: Apr. 25, 2013

(65) Prior Publication Data
US 2013/0187435 A1    Jul. 25, 2013

(30) Foreign Application Priority Data

Oct. 17, 2011  (JP) .................................. 2011-228238

(51) Int. Cl.
*B60P 1/28*        (2006.01)
(52) U.S. Cl.
USPC ...................................................... 298/17 R
(58) Field of Classification Search
USPC ...... 298/11, 1 B, 1 R, 17 R, 17 T, 18, 19 V, 2, 298/17.5–17.8; 280/47.17, 47.18, 47.26; 414/482, 495
See application file for complete search history.

(56) References Cited

U.S. PATENT DOCUMENTS

| 2,974,997 | A | | 3/1961 | Parsley et al. |
| 3,331,433 | A | | 7/1967 | Hagberg |
| 3,499,678 | A | * | 3/1970 | Richler ......................... 296/208 |
| 3,664,706 | A | * | 5/1972 | Chant ........................... 298/1 H |

(Continued)

FOREIGN PATENT DOCUMENTS

| CA | 2762800 A1 | 6/2012 |
| CN | 201211859 Y | 3/2009 |

(Continued)

OTHER PUBLICATIONS

Office Action issued May 17, 2013 from corresponding Canadian Patent Application No. 2804071, in English, 3 pages.

(Continued)

*Primary Examiner* — Glenn Dayoan
*Assistant Examiner* — Sunsurraye Westbrook
(74) *Attorney, Agent, or Firm* — Fish & Richardson P.C.

(57) ABSTRACT

A dump body includes a front plate, a bottom plate integrally provided on a lower part of the front plate, and a pair of right and left side plates provided on sides of the front plate and the bottom plate. On a lower part of an outer surface of the front plate, a linear hollow lower rib extending in a right-left direction and a pair of right and left vertical ribs that are in communication with the lower rib at lower ends thereof are provided. An exhaust gas flow path of an exhaust gas is defined including an inner space of the lower rib and an inner space of the vertical ribs. The exhaust gas flow path is in communication a flow-path forming section of a box shape that allows the exhaust gas flowing in the exhaust gas flow path to go downward relative to the lower rib.

25 Claims, 7 Drawing Sheets

(56) References Cited

U.S. PATENT DOCUMENTS

| | | | | |
|---|---|---|---|---|
| 4,623,197 A | * | 11/1986 | Stluka | 298/10 |
| 4,844,336 A | * | 7/1989 | Huber et al. | 237/12.3 R |
| 4,877,184 A | * | 10/1989 | Johnston | 237/12.3 C |
| 6,565,146 B2 | * | 5/2003 | Fujan et al. | 296/183.2 |
| 7,320,504 B2 | * | 1/2008 | Colling | 298/1 H |

FOREIGN PATENT DOCUMENTS

| | | |
|---|---|---|
| DE | 35 10240 A1 | 10/1986 |
| GB | 746737 A | 3/1956 |
| JP | 34000810 B1 | 2/1959 |
| JP | 57048703 Y2 | 10/1982 |
| JP | 04130534 U1 | 11/1992 |

OTHER PUBLICATIONS

Office Action issued in corresponding Chinese Patent Application No. 201280002294.0 on Sep. 30, 2013, including English translation, 6 pages.

\* cited by examiner

DUMP BODY

CROSS REFERENCE TO RELATED APPLICATIONS

This application claims priority to Application No. PCT/JP2012/066967, filed on Jul. 3, 2012, which application claims priority to Japanese Application No. 2011-228238, filed on Oct. 17, 2011. The entire contents of the above applications are incorporated herein by reference in their entireties.

TECHNICAL FIELD

The present invention relates to a dump body. More specifically, the present invention relates to an improvement in an exhaust gas flow path for heating the dump body.

BACKGROUND ART

Large-sized off-road dump trucks typically used in a mine and the like are equipped with a body that is supported by a chassis frame in a liftable manner. Earth, sand and the like are loaded in the body and are unloaded by raising the body after being transported to a predetermined site.

In order to keep the earth and sand from adhering on an inner surface of the body when the earth and sand are unloaded, exhaust gas from an engine is circulated in an exhaust gas flow path defined by an inner space of ribs provided in the body, thereby heating the body. Heating the body vaporizes water contained in the earth and sand so that the earth and sand is dried. Thus, releasability of the earth and sand from the inner surface of the body can be enhanced (see, for instance, Patent Literature 1).

The earth and sand carried in the body is likely to be adhered on a corner defined at a border between a front plate and a bottom plate of the body or on corners defined by the front plate, the bottom plate and right or left side plates. Accordingly, the inner space of the ribs provided corresponding to the corners is used as the exhaust gas flow path.

CITATION LIST

Patent Literature(s)

Patent Literature 1 JP-U-4-130534

SUMMARY OF THE INVENTION

Problems to be Solved by the Invention

The body is roughly classified into a plurality of types according to configurations of a bottom portion thereof. Examples of the body include: a (commonly-used) flat body having a flat bottom plate as disclosed in Patent Literature 1; a V-shaped body having a V-shaped cross section taken along a line parallel to a right-left direction (width direction) of the vehicle; and a round body that is bulged downward in a cross section taken along the line parallel to the right-left direction.

When the body is a flat body, since the corner defined by the front plate and the bottom plate exhibits a small inner curvature radius (sometimes referred to as R hereinafter) and is linearly formed in the right-left direction, a single linear horizontal rib provided on the front plate along the corner is sufficient for efficient heating of the corner by using the inner space of the rib as the exhaust gas flow path. Further, the linear arrangement of the rib is advantageous in productivity and production cost and in that the weight does not unnecessarily increase.

However, when a single linear rib is provided to a V-shaped body or a round body, the bottom plate inevitably projects downward beyond the rib and the corner defined by the front plate and the bottom plate is spaced from the rib. Accordingly, the corner cannot be sufficiently heated by the exhaust gas passing through the rib, thereby deteriorating the releasability of earth and sand.

In order to overcome the above deficiencies, the rib may be provided in a form conforming to the V-shape or round shape of the body. However, such a solution is disadvantageous in the above-described productivity, production cost and weight reduction and is consequently not adoptable.

On the other hand, when the inner curvature radius of the corner defined by the front plate and the bottom plate of a flat body is increased in order to enhance the releasability of earth and sand, a rib of an irregular cross section is preferably provided to cover the corner defined by a curve. However, such a solution is also difficult to be implemented in terms of the above-described productivity, production cost and weight reduction. Thus, a single linear rib is provided to a flat face of the front plate at a position upwardly remote from the corner, so that the rib is spaced from the corner and the corner cannot be efficiently heated.

An object of the invention is to provide a dump body capable of efficiently heating the corner of a dump body of a configuration in which a corner is spaced from a single linear rib provided on the dump body.

Means for Solving the Problems

A dump body according to a first aspect of the invention includes: a front plate; a bottom plate provided on a lower part of the front plate; a pair of right and left side plates that are integrally provided on sides of the front plate and the bottom plate; a linear hollow lower rib extending in a right-left direction provided on a lower part of an outer surface of the front plate; a pair of right and left vertical ribs of which lower ends are in communication with the lower rib; and an exhaust gas flow path defined including an inner space of the lower rib and an inner space of the vertical ribs, in which the exhaust gas flow path comprises a flow-path forming section in a shape of a box that defines a bypass for an exhaust gas flowing in the exhaust gas flow path to go downward relative to the lower rib, the flow-path forming section being bonded to an outer surface of the dump body.

In a dump body according to a second aspect of the invention, the exhaust gas flow path and the flow-path forming section are in communication with each other through an opening provided in the lower rib.

In a dump body according to a third aspect of the invention, the opening comprises a plurality of openings provided in the lower rib, and the inner space of the lower rib is closed by a partition between adjacent ones of the plurality of openings.

In a dump body according to a fourth aspect of the invention, the opening provided in the lower rib is divided at least into a first opening and a second opening by a partition extended from the inner space of the lower rib.

In a dump body according to a fifth aspect of the invention, the flow-path forming section is bonded to a lower part of the lower rib.

In a dump body according to a sixth aspect of the invention, the flow-path forming section is provided at least corresponding to a center of the lower rib in the right-left direction.

In a dump body according to a seventh aspect of the invention, the flow-path forming section is provided at least corresponding to both ends of the lower rib in the right-left direction.

In a dump body according to an eighth aspect of the invention, the flow-path forming section is provided over substantially an entire area of the lower rib in the right-left direction.

According to the first aspect of the invention, since the flow-path forming section is provided to the typical exhaust gas flow path to allow the exhaust gas to go around toward under a lower side of the lower rib, the exhaust gas can be delivered toward the corner located under the lower side of the lower rib to heat the corner, so that the releasability of earth and sand at the corner of a V-shaped body or a round body or at a corner portion at which the front plate and the bottom plate are continuous at a large curvature radius can be enhanced.

According to the second aspect of the invention, since the opening is provided to the lower rib, the exhaust gas flow path can be reliably brought into communication with the flow-path forming section with a simple structure.

According to the third aspect of the invention, the partition provided in the lower rib keeps the exhaust gas from flowing in the lower rib without passing through the flow-path forming section, thereby further reliably heating the corner.

According to the fourth aspect of the invention, since a single opening is divided into two openings by the partition, the first and second openings through which the exhaust gas flows in and out can be adjacently arranged, so that the flow-path forming section with short flow-path length in the right-left direction can be suitably used.

According to the fifth aspect of the invention, since the flow-path forming section is bonded to the lower part of the lower rib, the exhaust gas from the exhaust gas flow path can be introduced to the flow-path forming section from directly above the corner with a short distance, so that the temperature of the exhaust gas is unlikely to be reduced, thereby reliably heating the corner with the exhaust gas of a higher temperature.

According to the sixth to eighth aspects of the invention, since the flow-path forming sections of various types are used corresponding to the shape of the body, the releasability of earth and sand of each of the bodies can be enhanced. For instance, releasability of earth and sand of the V-shaped body or the round body in which the lower rib is the most remote from the corner at the center thereof can be enhanced by providing the flow-path forming section at least at the center thereof. Further, when a corner of a flat body defined by a front plate and a bottom plate has a large curvature radius, the flow-path forming section is suitably provided on the substantially entire area of the corner. Further, the flow-path forming section provided on both sides can enhance the releasability of earth and sand at a corner in bodies of various shapes.

DESCRIPTION OF EMBODIMENT(S)

Exemplary embodiment(s) of the invention will be described below with reference to the attached drawings.

Figure 1:
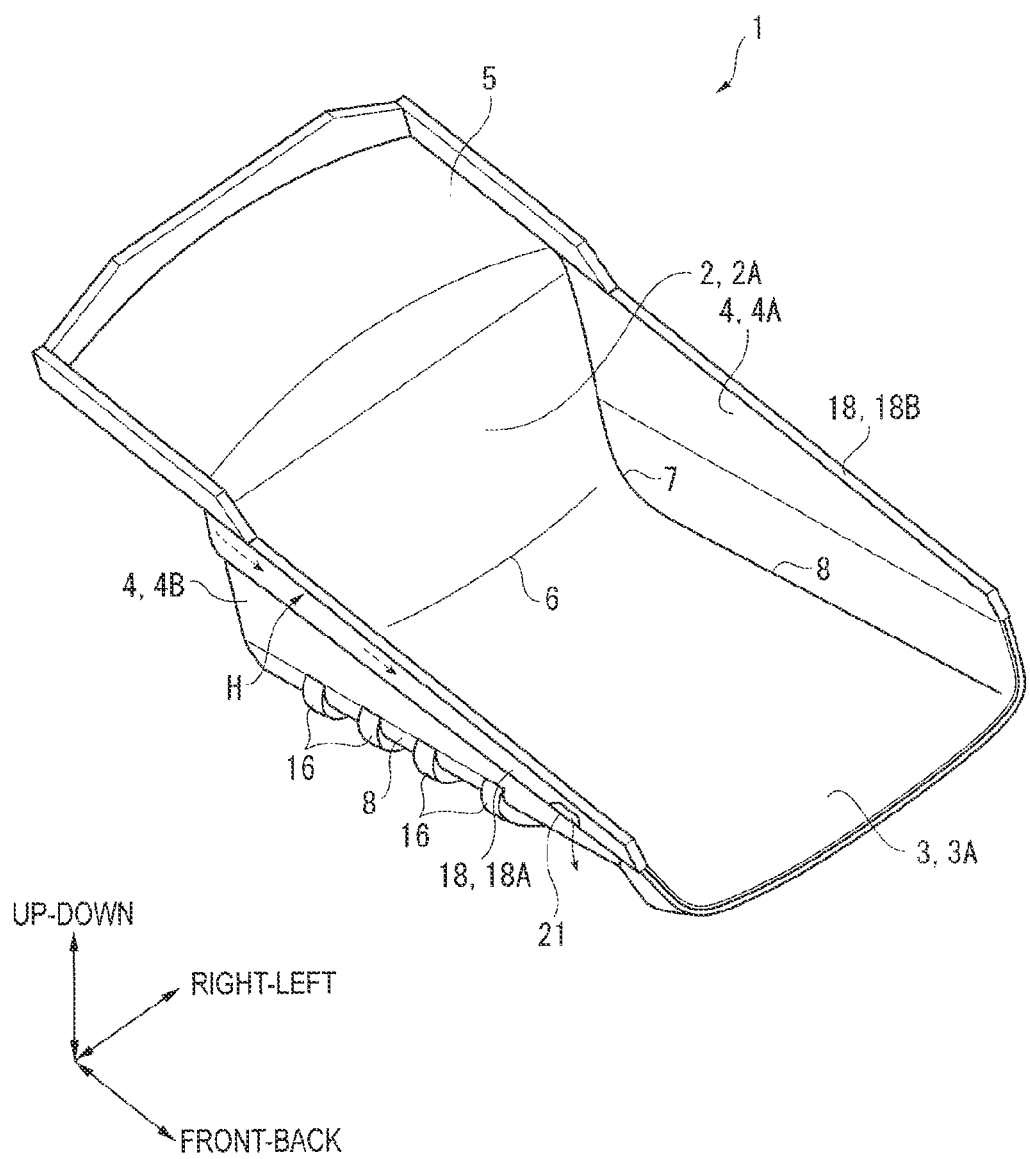
FIG. 1 is a perspective view showing an entire dump body from diagonally above according to an exemplary embodiment of the invention.

FIG. 1 is a perspective view showing a dump body (referred to as a "body" hereinafter) 1 according to the exemplary embodiment from diagonally above. It should be noted that, in the following description, "front-back" refers to a direction parallel to a longitudinal direction (front-back direction) of the body 1, "right-left" refers to a direction parallel to a width direction (right-left direction) of the body 1 and "up-down." refers to a direction parallel to a height direction of the body 1. In addition, a surface of the body 1 on which earth, sand and the like are loaded is an inner surface and a surface opposite to the inner surface is an outer surface.

A rear side of the body 1 in FIG. 1 is pivotally supported on a chassis frame (not shown) of a dump truck so that the body 1 is capable of lift (dump) movement by stretching and contracting a pair of right and left hoist cylinders.

The body 1 is roughly provided by a front plate 2 defining a front portion, a bottom plate 3 integrated with the front plate 2 to define a bottom portion, a pair of side plates 4 integrally provided on both sides of the front plate 2 and the bottom plate 3, and a protector 5 (serving as a roof) covering an upper side of a cab and an engine room mounted on the chassis frame (not shown). The front plate 2, the bottom plate 3, the side plates 4 and the protector 5 are integrated (bonded) by welding and the like. The body 1 of the exemplary embodiment is configured as a round body in which the bottom plate 3 is slightly bulged downward.

In the body 1, an inner surface 2A of the front plate 2 and an inner surface 3A of the bottom plate 3 (corresponding to the bottom surface) are continued at the corner 6 to define the corner 6 extending along the right-left direction. The corner 6 is defined by a curved surface having a large inner curvature radius from the inner surface 2A to the inner surface 3A in order to enhance the releasability of earth and sand.

A corner 7 is defined at an intersection of the inner surface 2A of the front plate 2, the inner surface 3A of the bottom plate 3 and an inner surface 4A of each of the side plates 4.

The inner surface 3A of the bottom plate 3 and the inner surface 4A of each of the side plates 4 are continued at a corner 8. The corner 8 is defined along the front-back direction and is defined as a curved surface of which inner curvature radius is smaller than that of the corner 6.

Figure 2:
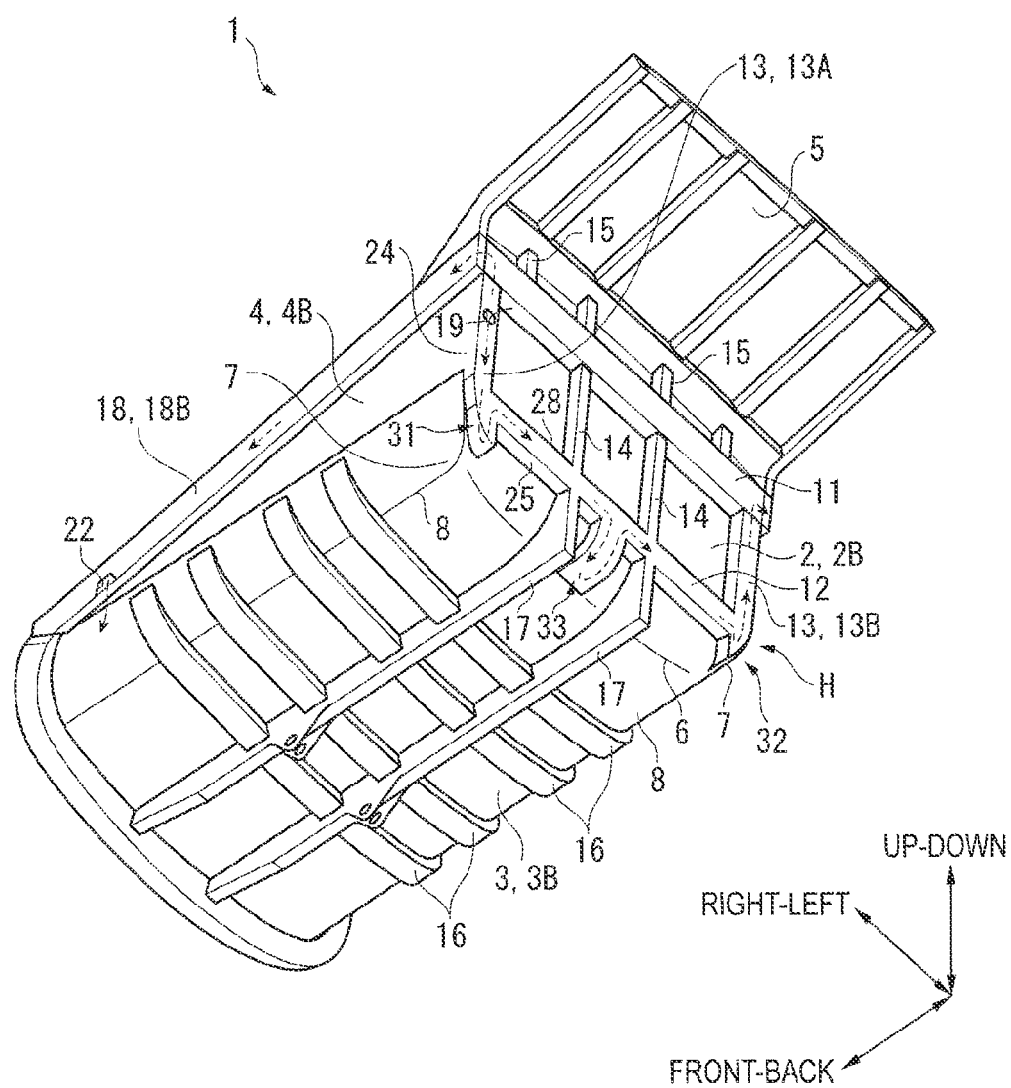
FIG. 2 is a perspective illustration showing the entire dump body from diagonally below.

FIG. 2 is a perspective view showing the body 1 from diagonally below.

As shown in FIG. 2, a plurality of ribs are provided on the outer surface of the body 1 to enhance strength and rigidity of the body 1.

Specifically, an outer surface 2B of the front plate 2 of the body 1 is provided thereon with: a linear upper rib 11 horizontally extending on an upper side in the right-left direction; a linear lower rib 12 horizontally extending on a lower side in the right-left direction; a pair of right and left first vertical ribs 13 of which ends are connected to ends of the upper rib 11 and the lower rib 12; a pair of right and left second vertical ribs 14 of which ends are connected to a section between the upper rib 11 and the lower rib 12; and a plurality of (four in the exemplary embodiment) third vertical ribs 15 provided between the upper rib 11 and the protector 5.

A plurality of (four in the exemplary embodiment) horizontal ribs 16 extending parallel to the right-left direction and spaced apart in the front-back direction and a pair of longitudinal ribs 17 extending in the front-back direction so as to perpendicularly intersect middle portions of the horizontal ribs 16 are provided on an outer surface 3B of the bottom plate 3. The horizontal ribs 16 are curved to conform to a round shape of the bottom plate 3. Both ends of the horizontal ribs 16 reach an outer surface 4B of the side plate 4 beyond the corner 8. Front ends of the longitudinal rib 17 reach the outer surface 2B of the front plate 2 beyond the corner 6. An interval between the longitudinal ribs 17 is the same as an interval between the second vertical ribs 14.

Side ribs 18 extending in the front-back direction along an upper periphery of the side plate 4 is provided on the outer surface 4B of the side plate 4.

The above-described ribs 11 to 18 are provided by steel material of C-shaped cross section. The ribs 11 to 18 are bonded to the respective outer surfaces of the body 1 to form rectangular closed sections. Both ends of the upper rib 11 provided on the front plate 2, the inner space of the lower rib 12, the inner space of the right and left first vertical ribs 13 and the inner space of the respective side ribs 18 are in communication with each other to define an exhaust gas flow path H in which the exhaust gas from the engine flows. The exhaust gas flowing through the exhaust gas flow path H is shown as solid arrows and dotted arrows in FIGS. 1 and 2. The same applies to the rest of the drawings referenced in the description below.

An inlet 19 that is in communication with an exhaust pipe on the side of the chassis frame when the body 1 is horizontally laid is provided to one of the first vertical ribs 13 (13A). Most of the exhaust gas introduced through the inlet 19 flows downward in the first vertical rib 13A and, subsequently, horizontally flows in the lower rib 12 and flows upward in the other first vertical rib 13B. Then, the exhaust gas flows into one of the side ribs 18 (18A: see also FIG. 1) through one of the ends of the upper rib 11. After flowing backward in the side rib 18A, the exhaust gas is discharged through a main exhaust outlet 21 provided on a rear side of the side rib 18A.

A part of the exhaust gas introduced through the inlet 19 flows upward in the first vertical rib 13A to flow into another side rib 18B through the other end of the upper rib 11. After flowing backward in the side rib 18B, the exhaust gas is discharged through a sub exhaust outlet 22 provided on a rear side of the side rib 18B. By properly designing a cross sectional area of the exhaust gas flow path back pressure in the exhaust gas flow path H is kept from becoming excessively high to avoid adverse influence on the engine.

Figure 3:
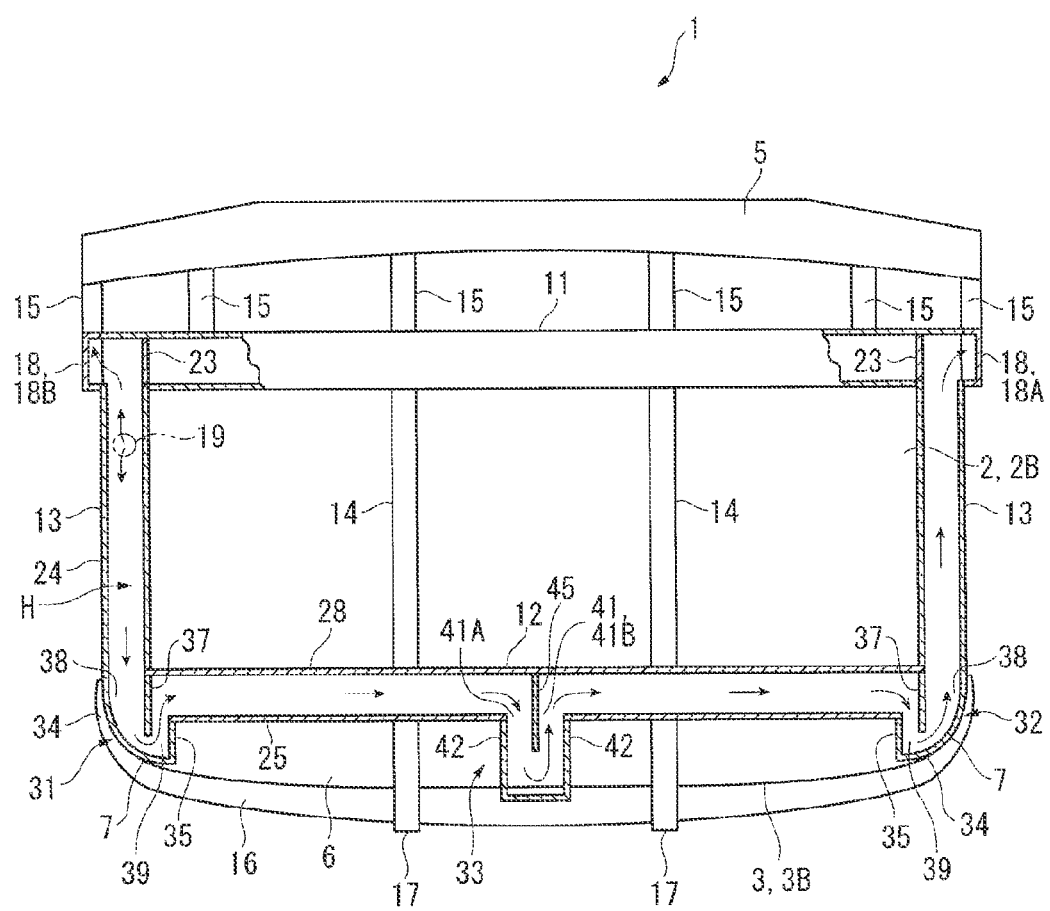
FIG. 3 is a partially sectioned front elevation showing the dump body.

Incidentally, as shown in FIG. 3, both ends of the upper rib 11 is closed by a partition 23 to keep the exhaust gas from horizontally flowing in the inner space of the upper rib 11.

Further, the body 1 of this exemplary embodiment has a specific structure used for a round body. Specifically, since the body 1 is provided as a round body and thus has a bottom bulged downward and the front plate 2 and the bottom plate 3 are continuous at the corners 6 and 7 at a large inner curvature radius, the bottom of the body 1 is greatly bulged downward beyond the lower rib 12. Thus, since the portions corresponding to the corners 6 and 7 cannot be efficiently heated only by circulating the exhaust gas to the inner space of the lower rib 12, a part of the exhaust gas flow path H extends near to the corners 6 and 7 as shown in FIGS. 2 and 3.

More specifically, first and second flow-path forming sections 31 and 32 extended downward toward the corner 7 are provided on the front plate 2 at intersections (communicating portions) between the portions corresponding to both ends of the lower rib 12 and the lower ends of the first vertical ribs 13A and 13B. A third flow-path forming section 33 extended downward toward the corner 6 is also provided at a position corresponding to the center of the lower rib 12 in the right-left direction. The first to third flow-path forming sections 31 to 33 are provided in box shapes and are bonded to a lower part of the lower rib 12 and the outer surface of the body 1. Insides of the first to third flow-path forming sections 31 to 33 are hermetically sealed with an outside.

The first to third flow-path forming sections 31 to 33 may also be bonded onto the outer surfaces of the body 1 at which the corners 6 and 7 are defined in addition to the flat outer surface 2B of the front plate 2. Further, when the first to third flow-path forming sections 31 to 33 are provided beyond the corners 6 and 7, first to third flow-path forming sections 31 to 33 may further extend to the flat outer surface 3B on the bottom plate 3 and/or the flat outer surface 4B on the side plate 4.

Figure 4:
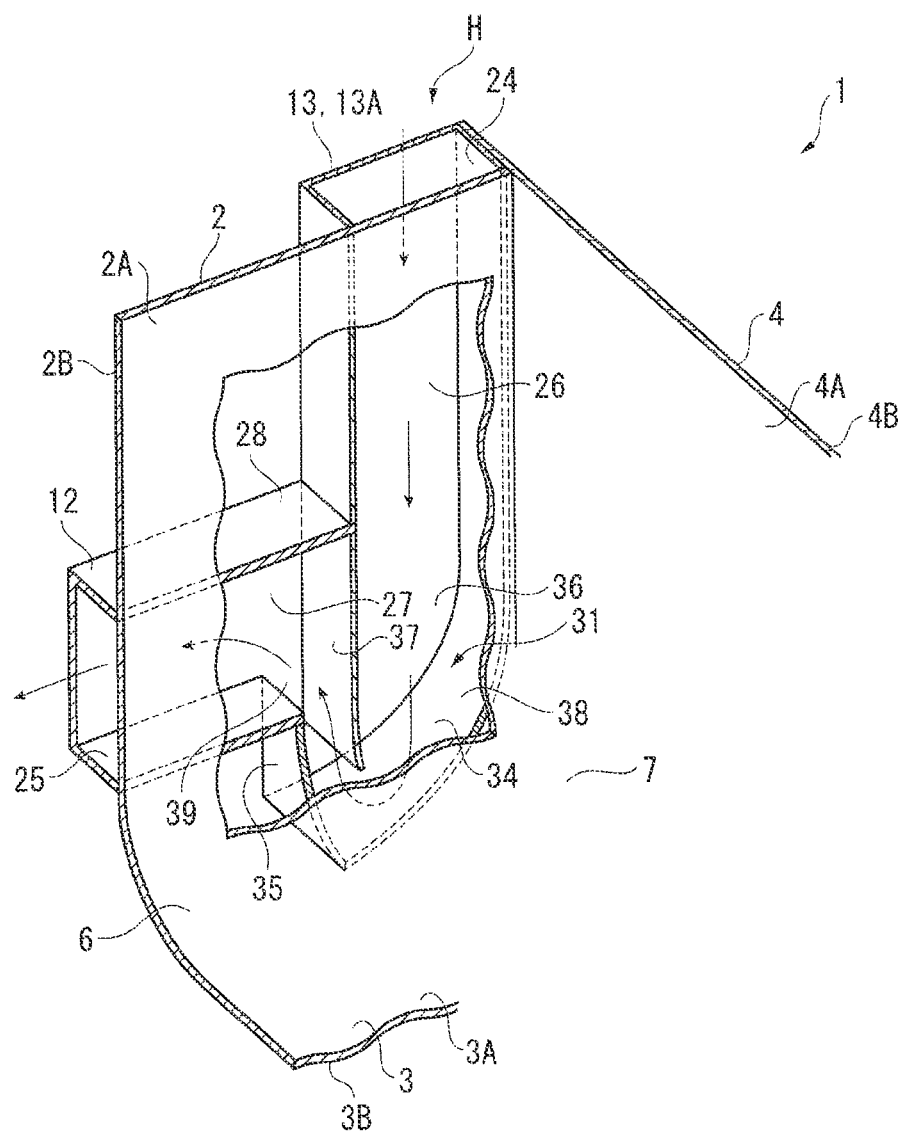
FIG. 4 is a partially sectioned perspective view showing a corner defined by a front plate, bottom plate and side plate of the dump body from an inside of the dump body.

FIG. 4 shows an inner structure of the first flow-path forming section 31 as seen from the inside of the body 1 in an enlarged manner.

The first flow-path forming section 31 will be described below with reference to FIGS. 3 and 4 as an example of the first and second flow-path forming section 31 and 32. Since the second flow-path forming section 32 is line-symmetric with the first flow-path funning section 31 and therefore can be understood by describing the first flow-path forming section 31, the explanation of the second flow-path forming section 32 will be omitted herein.

The first flow-path forming section 31 includes: a curved portion 34 that is continuous with one of side faces 24 of the first vertical rib 13A to extend downward and is curved to extend toward a lower face 25 of the lower rib 12; a vertical face 35 that closes a gap between an end of the curved portion 34 and the lower rib 12; and a front face 36 that closes an area defined by the curved portion 34 and the vertical face 35 from a front side. The front face 36 is continuous and smooth with a front face 26 of the first vertical rib 13A and a front face 27 of the lower rib 12. In the above, portions of the curved portion 34 and the vertical face 35 to be connected with the front plate 2 conform to the corner 7.

Further, a partition 37 vertically extends from an end of an upper face 28 of the lower rib 12 inside the first flow-path forming section 31 to shield an opening of an end of the lower rib 12. A lower end of the partition 37 extends downward beyond an end of the lower face 25. A first opening 38 in communication with a lower end of the first vertical rib 13A is defined by a space between the partition 37 and the curved portion 34. In contrast, an end of the lower face 25 of the lower rib 12 is cut, at which a vertical face 35 of the first flow-path forming section 31 is connected. A second opening 39 is defined between the end and the partition 37.

Consequently, the exhaust gas flowing downward in the first vertical rib 13A enters the first flow-path forming section 31 through the first opening 38 to reach a proximity of the corner 7. Subsequently, the exhaust gas goes around the lower end of the partition 37 to enter the lower rib 12 through the second opening 39. Thus, the exhaust gas flowing in the first flow-path forming section 31 efficiently heats the proximity of the corner 7.

In contrast, in the second flow-path forming section 32, the exhaust gas flowing through the lower rib 12 enters the second flow-path forming section 32 through the second opening 39 and goes around the lower end of the partition 37 extended toward near the corner 7 to enter the first vertical rib 13B through the first opening 38. However, the second flow-path forming section 32 also allows efficient heating of the proximity of the corner 7 in the same manner as the first flow-path forming section 31.

Figure 5:
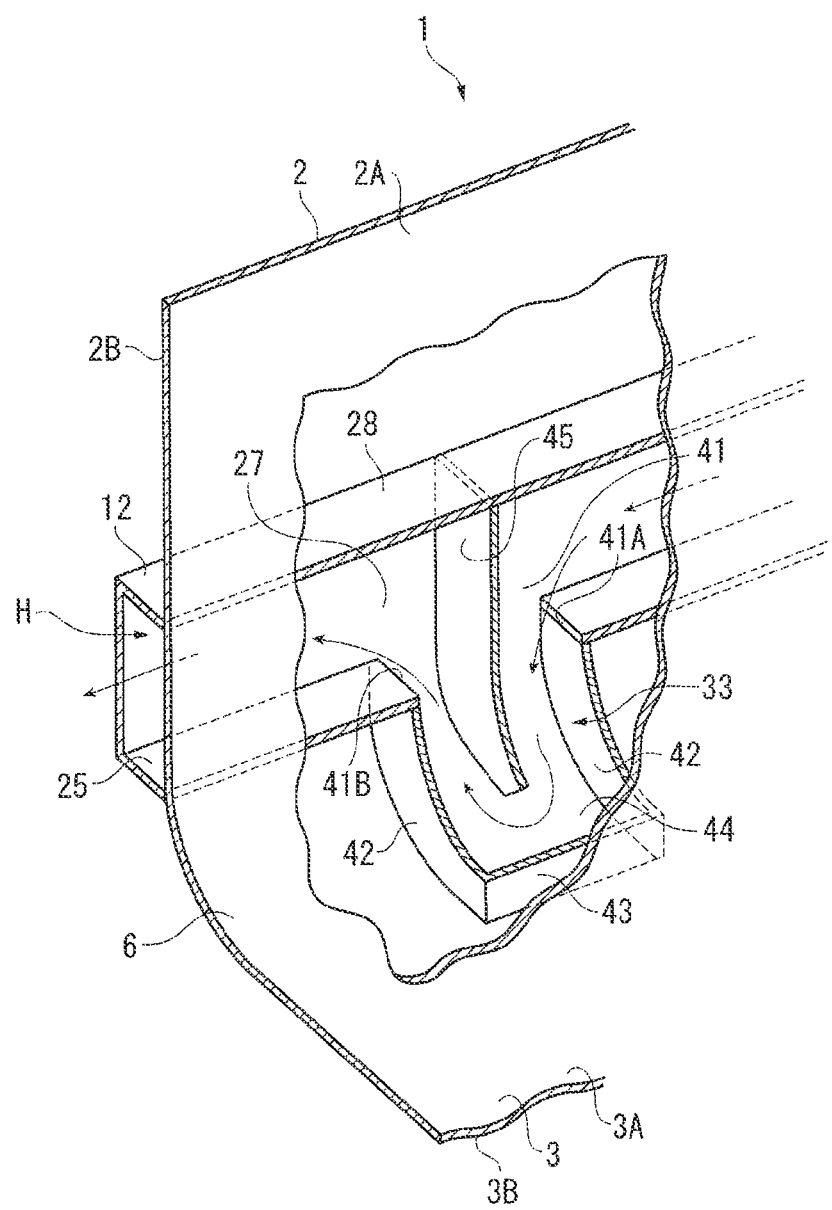
FIG. 5 is a partially sectioned perspective view showing a corner defined by the front plate and bottom plate of the dump body from an inside of the dump body.

FIG. 5 shows an inner structure of the third flow-path forming section 33 as seen from the inside of the body 1 in an enlarged manner.

As shown in FIGS. 3 and 5, an opening 41 is provided at a center of the lower face 25 of the lower rib 12 in the right-left direction. The third flow-path forming section 33 is in communication with an inside of the lower rib 12 through the opening 41.

The third flow-path forming section 33 includes: a right and left pair of side faces 42 having an upper end connected with an inner periphery of the opening 41 and a lower end reaching a proximity of a flat portion of the outer surface 3B of the bottom plate 3 beyond the corner 6; a vertical back face 43 closing a gap between the ends of the side faces 42; and a front face 44 closing an area defined by the side faces 42 and the back face 43 from front and lower sides. The front face 44 is continuous and smooth with the front face 27 of the lower rib 12. The side faces 42 and the front face 44 are curved to conform to the corner 6 of the large inner curvature radius.

A partition 45 is provided to extends across insides of the lower rib 12 and the third flow-path forming section 33. The partition 45 is vertically situated to partition the inside of the lower rib 12 and divides the opening 41 into a first opening 41A (in the right in FIG. 5) and a second opening 41B (in the left in FIG. 5). A lower side of the partition 45 partitions the inside of the third flow-path forming section 33 to a position before reaching the corner 6 (i.e. the partition 45 does not reach the back face 43).

Consequently, at the center of the lower rib 12 in the right-left direction, the exhaust gas horizontally flowing inside the lower rib 12 enters the third flow-path forming section 33 through the first opening 41A to reach the corner 6 and goes around the lower end of the partition 45 to go back to a downstream in the lower rib 12 through the second opening 41B. Thus, the exhaust gas flowing in the third flow-path forming section 31 efficiently heats the proximity of the corner 6.

As described above, since the first to third flow-path forming sections 31 to 33 are provided in this exemplary embodiment, the exhaust gas can go around to reach the areas capable of sufficiently heating the corners 6 and 7. Since the corners 6 and 7 are securely heated, the releasability of sand and earth at the corners 6 and 7 remote from the lower rib 12 of a round body can be enhanced.

Incidentally, it should be understood that the scope of the present invention is not limited to the above-described exemplary embodiment but includes modifications and improvements as long as the modifications and improvements are compatible with the invention.

Figure 6:
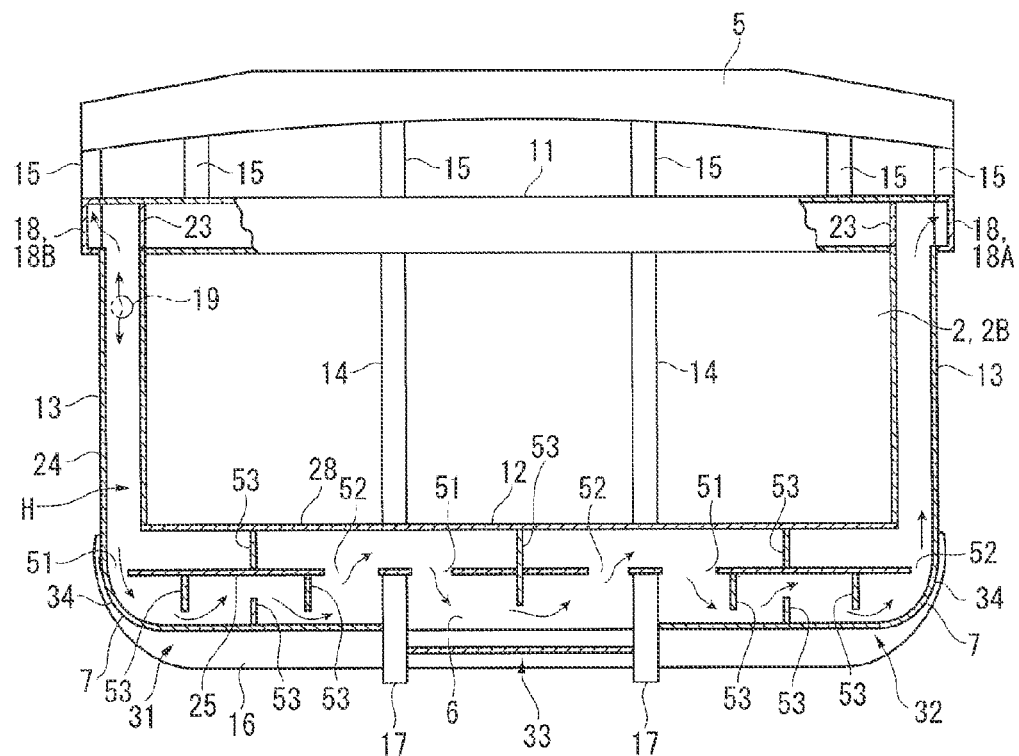
FIG. 6 is a front elevation showing a dump body according to a first modification of the invention.

For instance, though the invention is applied to a round body in the above exemplary embodiment, the invention is applicable to a flat body of which corner 6 has a large inner curvature radius as shown in FIG. 6 (first modification).

Further, the flow-path forming section for allowing the exhaust gas to go around toward the corners 6 and 7 may be configured in any manner and is not limited to the structure as described in the exemplary embodiment. For instance, the first to third flow-path forming sections 31 to 33 may be constructed to cover the entire area between the corners 7 on both right and left sides including the corner 6 as shown in FIG. 6.

Specifically, in the first and second flow-path forming sections 31 and 32 on the right and left sides, the curved portion 34 extends along the corner 6 and an end of the curved portion 34 is connected with each of the longitudinal ribs 17. In the third flow-path forming section 33, the curved right and left peripheries of the front face 44 are connected with opposite faces of the right and left longitudinal ribs 17. Inside the first to second flow-path forming sections 31 to 33, first openings 51 and second openings 52 opened to the interior of the lower rib 12 are provided on both right and left sides thereof to allow the heating of the corner 6 for a longer distance.

Further, a plurality of partitions 53 are provided inside the first and second flow-path forming sections 31 and 32 and inside the lower rib 12 to meander the exhaust gas flow to allow the corner 6 to be evenly heated. In addition, the plurality of partitions 53 prevent the exhaust gas from flowing in the lower rib 12 through adjacent ones of the first openings 51 and second openings 52.

Figure 7:
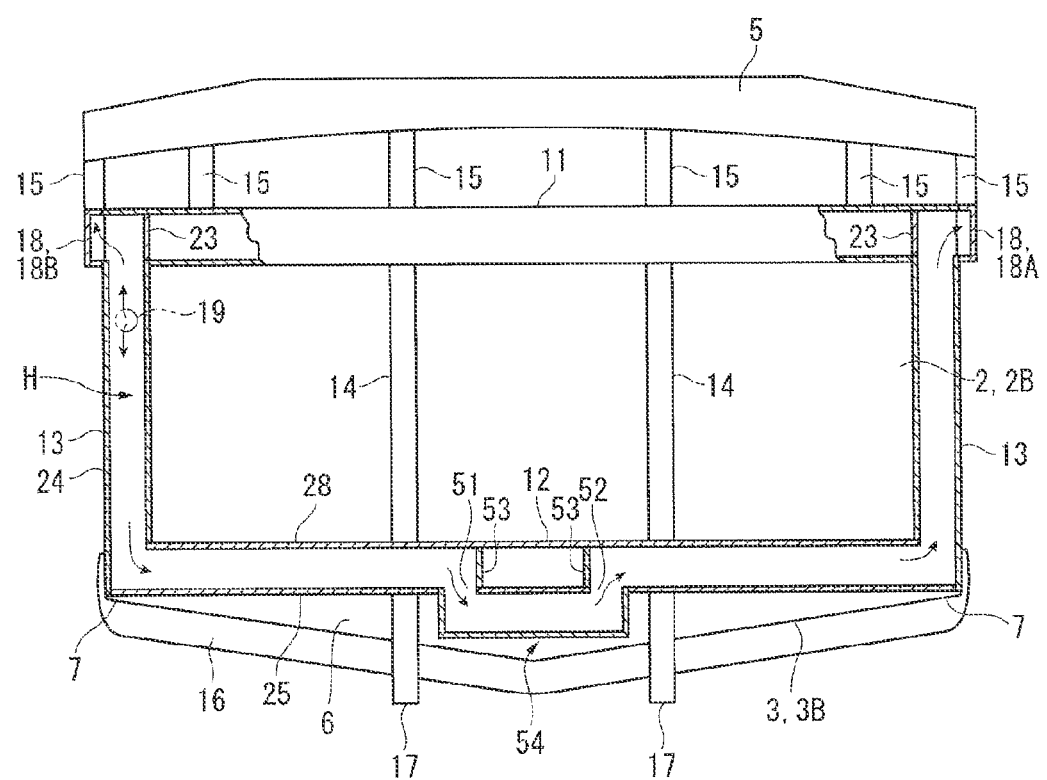
FIG. 7 is a front elevation showing a dump body according to a second modification of the invention.

FIG. 7 shows an example (second modification) which the invention is applied to a V-shaped body. Since the center of the corner 6 in the right-left direction is the most remote from the lower rib 12 in the V-shaped body, a flow-path forming section 54 is provided corresponding to the center portion in this modification. Though the flow-path forming section 54 may be configured in any manner, the flow-path forming section 54 of the second modification has a concave cross section covering a first opening 51 and a second opening 52 provided on the lower rib 12 spaced apart in the right-left direction, and has a pair of partitions 53 that keep the exhaust gas from flowing through the lower rib 12 at a section between the first opening 51 and the second opening 52. The second modification also provides advantages similar to those of the above-described exemplary embodiment, so that an object of the invention can be achieved.

In the above-described exemplary embodiment, the body 1 is provided by a round body and the corner 6 has a large curvature radius in order to enhance releasability of earth and sand. However, the invention is applicable to any round body even when the curvature radius is not so large. Further, the invention is applicable to a V-shaped body irrespective of whether the V-shaped body has a large curvature radius on the corner 6 or not.

The invention claimed is:
1. A dump body comprising:
a front plate;
a bottom plate provided on a lower part of the front plate;
a pair of right and left side plates that are integrally provided on sides of the front plate and the bottom plate;
a linear hollow lower rib extending in a right-left direction provided on a lower part of an outer surface of the front plate;
a pair of right and left vertical ribs of which lower ends are in communication with the lower rib; and
an exhaust gas flow path defined including an inner space of the lower rib and an inner space of the vertical ribs, wherein
the exhaust gas flow path comprises a flow-path forming section in a shape of a box that defines a bypass for an exhaust gas flowing in the exhaust gas flow path to go downward relative to the lower rib and returns the exhaust gas to the exhaust gas flow path, the flow-path forming section being bonded to an outer surface of the dump body.
2. The dump body according to claim 1, wherein
the exhaust gas flow path and the flow-path forming section are in communication with each other through an opening provided in the lower rib.

3. The dump body according to claim 2, wherein
the opening comprises a plurality of openings provided in the lower rib, and
the inner space of the lower rib is closed by a partition between adjacent ones of the plurality of openings.

4. The dump body according to claim 2, wherein
the opening provided in the lower rib is divided at least into a first opening and a second opening by a partition extended from the inner space of the lower rib.

5. The dump body according to claim 1, wherein
the flow-path forming section is bonded to a lower part of the lower rib.

6. The dump body according to claim 1, wherein
the flow-path forming section is provided at least corresponding to a center of the lower rib in the right-left direction.

7. The dump body according to claim 1, wherein
the flow-path forming section is provided at least corresponding to both ends of the lower rib in the right-left direction.

8. The dump body according to claim 1, wherein
the flow-path forming section is provided over substantially an entire area of the lower rib in the right-left direction.

9. The dump body according to claim 3, wherein
the opening provided in the lower rib is divided at least into a first opening and a second opening by a partition extended from the inner space of the lower rib.

10. The dump body according to claim 2, wherein
the flow-path forming section is bonded to a lower part of the lower rib.

11. The dump body according to claim 3, wherein
the flow-path forming section is bonded to a lower part of the lower rib.

12. The dump body according to claim 4, wherein
the flow-path forming section is bonded to a lower part of the lower rib.

13. The dump body according to claim 2, wherein
the flow-path forming section is provided at least corresponding to a center of the lower rib in the right-left direction.

14. The dump body according to claim 3, wherein
the flow-path forming section is provided at least corresponding to a center of the lower rib in the right-left direction.

15. The dump body according to claim 4, wherein
the flow-path forming section is provided at least corresponding to a center of the lower rib in the right-left direction.

16. The dump body according to claim 5, wherein
the flow-path forming section is provided at least corresponding to a center of the lower rib in the right-left direction.

17. The dump body according to claim 2, wherein
the flow-path forming section is provided at least corresponding to both ends of the lower rib in the right-left direction.

18. The dump body according to claim 3, wherein
the flow-path forming section is provided at least corresponding to both ends of the lower rib in the right-left direction.

19. The dump body according to claim 4, wherein
the flow-path forming section is provided at least corresponding to both ends of the lower rib in the right-left direction.

20. The dump body according to claim 5, wherein
the flow-path forming section is provided at least corresponding to both ends of the lower rib in the right-left direction.

21. The dump body according to claim 2, wherein
the flow-path forming section is provided over substantially an entire area of the lower rib in the right-left direction.

22. The dump body according to claim 3, wherein
the flow-path forming section is provided over substantially an entire area of the lower rib in the right-left direction.

23. The dump body according to claim 4, wherein
the flow-path forming section is provided over substantially an entire area of the lower rib in the right-left direction.

24. The dump body according to claim 5, wherein
the flow-path forming section is provided over substantially an entire area of the lower rib in the right-left direction.

25. The dump body according to claim 1, wherein the flow-path returning section is configured to return the exhaust gas to the exhaust gas flow path at the front plate.

* * * * *